US011897667B2

(12) United States Patent
Yeh

(10) Patent No.: US 11,897,667 B2
(45) Date of Patent: Feb. 13, 2024

(54) EMERGENCY RESPONSE CONTAINMENT VESSEL

(71) Applicant: LINDE LIENHWA INDUSTRIAL GASES CO., LTD., Taipei (TW)

(72) Inventor: Ming-Hui Yeh, Taipei (TW)

(73) Assignee: LINDE LIENHWA INDUSTRIAL GASES CO., LTD., Taipei (TW)

(*) Notice: Subject to any disclaimer, the term of this patent is extended or adjusted under 35 U.S.C. 154(b) by 348 days.

(21) Appl. No.: 17/452,935

(22) Filed: Oct. 29, 2021

(65) Prior Publication Data

US 2022/0135288 A1    May 5, 2022

(30) Foreign Application Priority Data

Oct. 30, 2020   (TW) ................................. 109137951

(51) Int. Cl.
*B65D 43/22* (2006.01)
*B65D 8/00* (2006.01)
*B65D 6/40* (2006.01)
*B65D 25/20* (2006.01)
*B65D 25/14* (2006.01)
*B65D 43/16* (2006.01)

(52) U.S. Cl.
CPC ............. *B65D 43/22* (2013.01); *B65D 7/045* (2013.01); *B65D 7/40* (2013.01); *B65D 25/14* (2013.01); *B65D 25/20* (2013.01); *B65D 43/166* (2013.01)

(58) Field of Classification Search
CPC .......... B65D 43/22; B65D 7/045; B65D 7/40; B65D 25/14; B65D 25/20; B65D 43/166
See application file for complete search history.

(56) References Cited

U.S. PATENT DOCUMENTS

| 1,663,570 A | * | 3/1928 | Senz ..................... B65D 39/08 220/297 |
| 3,401,842 A | * | 9/1968 | Morrison .............. B05B 7/2481 220/300 |
| 3,858,810 A | * | 1/1975 | Seeley .................. B05B 7/2408 220/571 |

(Continued)

FOREIGN PATENT DOCUMENTS

WO    WO-2016094398 A1 * 6/2016    ........... H01L 21/673

*Primary Examiner* — Jacob B Meyer
(74) *Attorney, Agent, or Firm* — LEWIS ROCA ROTHGERBER CHRISTIE LLP

(57) ABSTRACT

An emergency response containment vessel includes a sealing barrel and a carrier module for carrying and moving the sealing barrel. The sealing barrel includes a barrel body, a cover module, and a plurality of fastening modules. The barrel body includes a bottom wall and a surrounding wall connected to and surrounding the bottom wall, and has an opening opposite to the bottom wall. The cover module includes a cover pivotably connected to the surrounding wall, removably covering the opening, and formed with a plurality of notches. The fastening modules are connected to the surrounding wall and correspond in position respectively to the notches, and each including a stem removably disposed in and extending through a corresponding one of the notches and an abutment head movably connected to the stem and operable to move relative to and abut against the cover to press the cover on the surrounding wall when the cover covers the opening.

12 Claims, 4 Drawing Sheets

(56) References Cited

U.S. PATENT DOCUMENTS

| | | | | |
|---|---|---|---|---|
| 4,151,929 | A * | 5/1979 | Sapien | B05B 7/2408 |
| | | | | 220/373 |
| 5,664,610 | A * | 9/1997 | Nickens | B23B 41/00 |
| | | | | 141/330 |
| 9,259,960 | B1 * | 2/2016 | Tepsi | B44D 3/12 |
| 2003/0038142 | A1 * | 2/2003 | Gee | B65D 43/166 |
| | | | | 220/4.24 |
| 2013/0101708 | A1 * | 4/2013 | Short | B65D 85/345 |
| | | | | 220/254.1 |
| 2015/0108135 | A1 * | 4/2015 | Hanna | B05B 7/2481 |
| | | | | 220/495.06 |
| 2015/0274381 | A1 * | 10/2015 | Rockwell | B65D 43/22 |
| | | | | 220/256.1 |
| 2016/0059619 | A1 * | 3/2016 | Tepsi | B65D 43/02 |
| | | | | 220/495.08 |
| 2017/0305638 | A1 * | 10/2017 | Sonntag | B65D 25/2882 |
| 2017/0372931 | A1 * | 12/2017 | Kirkland | H01L 21/673 |
| 2019/0217999 | A1 * | 7/2019 | Wood | B65D 81/3813 |
| 2022/0135288 | A1 * | 5/2022 | Yeh | B65D 25/14 |
| | | | | 280/47.17 |

* cited by examiner

EMERGENCY RESPONSE CONTAINMENT VESSEL

CROSS-REFERENCE TO RELATED APPLICATION

This application claims priority of Taiwanese Patent Application No. 109137951, filed on Oct. 30, 2020.

FIELD

The disclosure relates to a cylinder treatment device, more particularly to an emergency response containment vessel (ERCV) for containing a cylinder.

BACKGROUND

Industrial liquid cylinders are conventionally used to contain chemical substances. In a situation where the content stored in a cylinder leaks out, the chemical substances may be harmful to the environment or the human body and thus emergency treatment of the cylinder is required. Generally, it is difficult to stop the leaking immediately and the cylinder is required to be transported to a specific treatment facility to empty the remaining content in the cylinder.

SUMMARY

Therefore, an object of the disclosure is to provide an emergency response containment vessel (ERCV) that is capable of transporting the cylinder in a sealing space.

According to an aspect of the disclosure, an emergency response containment vessel (ERCV) includes a sealing barrel and a carrier module. The sealing barrel includes a barrel body, a cover module, and a plurality of fastening modules.

The barrel body includes a bottom wall and a surrounding wall. The surrounding wall is connected to and surrounding a periphery of the bottom wall, and cooperates with the bottom wall to define a receiving space. The receiving space is adapted for receiving a cylinder therein and has an opening opposite to the bottom wall. The surrounding wall includes an upper rim that defines the opening.

The cover module is connected to an outer surface of the surrounding wall, and includes a cover that is pivotably connected to the surrounding wall and that removably covers the opening. The cover includes a central portion and an outer periphery. The central portion is disposed on the upper rim of the surrounding wall for covering the opening. The outer annular portion extends radially and outwardly from the central portion, and has an outer periphery that is indented to form a plurality of notches. The notches are angularly spaced apart from one another and extend from the outer periphery toward the central portion.

The fastening modules are connected to the outer surface of the surrounding wall, are disposed adjacent to the opening, and correspond in position respectively to the notches. Each of the fastening modules includes a stem and an abutment head. For each of the fastening modules, the stem has a connected end connected to the outer surface and a distal end opposite to the connected end, and is removably disposed in and extends through a corresponding one of the notches with the distal end beyond the cover when the cover covers the opening. For each of the fastening modules, the abutment head is movably connected to the distal end of the stem, and is operable to move relative to and abut against the cover to press the cover to the upper rim of the surrounding wall when the cover covers the opening.

The carrier module is connected to the barrel body, is configured to carry the sealing barrel, and includes a wheel unit for moving the sealing barrel.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
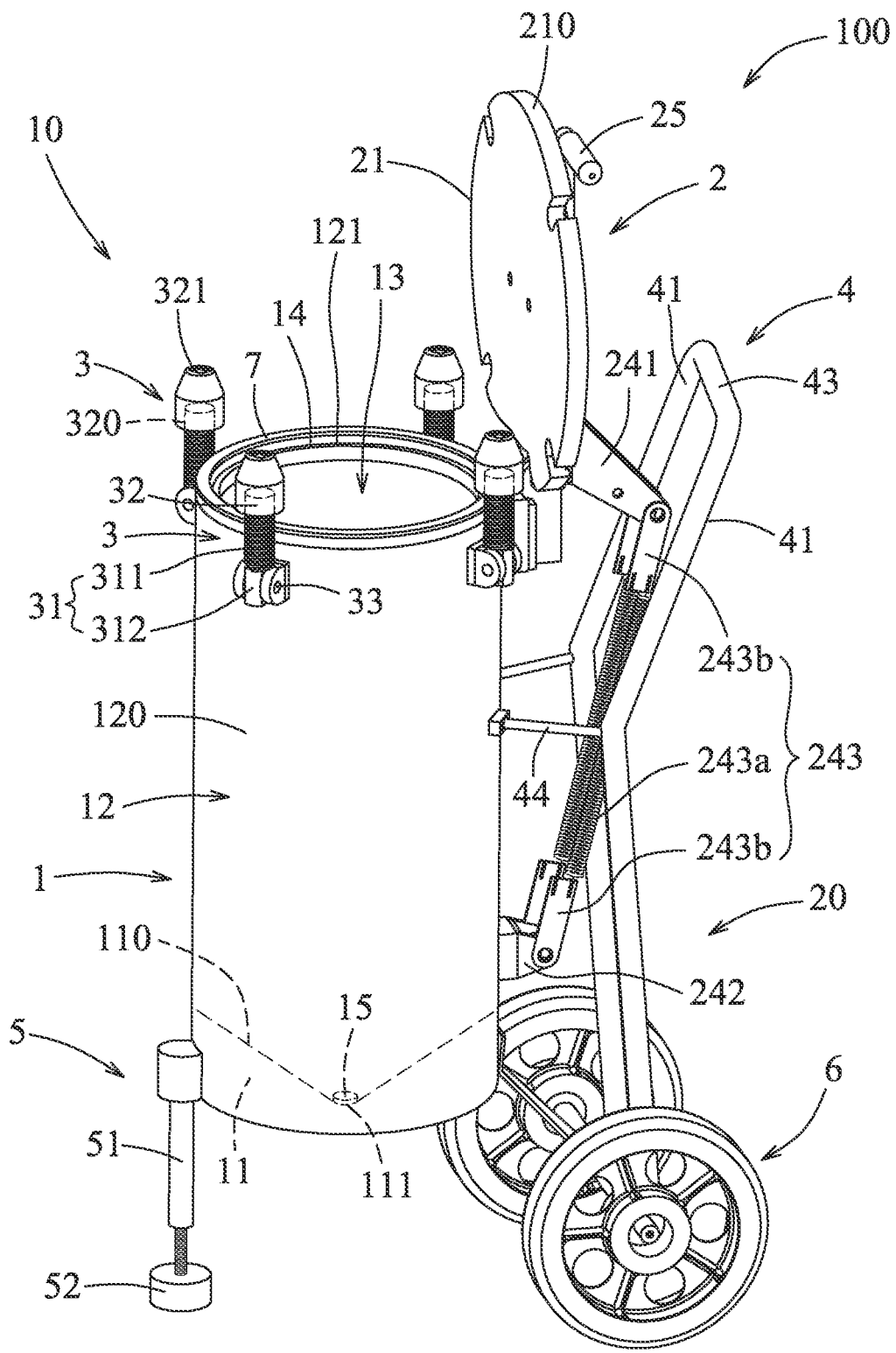
FIG. 1 is a schematic perspective view of an embodiment of an emergency response containment vessel (ERCV) according to the present disclosure.

Referring to FIGS. 1 to 4, an embodiment of an emergency response containment vessel (ERCV) 100 according to the present disclosure includes a sealing barrel 10 and a carrier module 20.

The sealing barrel 10 includes a barrel body 1, a cover module 2, and a plurality of fastening modules 3. The barrel body 1 includes a bottom wall 11, and a surrounding wall 12 that is connected to and surrounds a periphery of the bottom wall 11. The surrounding wall 12 cooperates with the bottom wall to define a receiving space 13 that is adapted for receiving a cylinder (not shown) therein and that has an opening 14 opposite to the bottom wall 11. The surrounding wall 12 includes an upper rim 121 that defines the opening 14 adapted to permit the cylinder to be disposed in and removed from the receiving space 13.

In this embodiment, the bottom wall 11 has an upper surface 110 facing upwardly. The upper surface 110 has a central plane portion that is formed with an outlet 111, and an outer inclined portion that surrounds the central plane portion and that is inclined downwardly from the periphery of the bottom wall 11 to the central plane portion. In a case where the content in the cylinder (e.g., a liquid chemical substance) leaks out of the cylinder and flows into the receiving space 13, a neutralizing agent can be added into the receiving space 13 to neutralize the liquid chemical substance into a neutralized liquid, and then the neutralized liquid can be discharged out of the receiving space 13 through the outlet 111. The barrel body 1 further includes a valve 15 disposed on the bottom wall 11 to cover the outlet 111 and configured to open and close the outlet 111. For example, the valve 15 may be a manual valve that is manually controlled with a handwheel (not shown), a solenoid valve that is controlled by a solenoid (not shown), an electromechanical valve that is controlled by an electric motor (not shown), etc.

Figure 2:
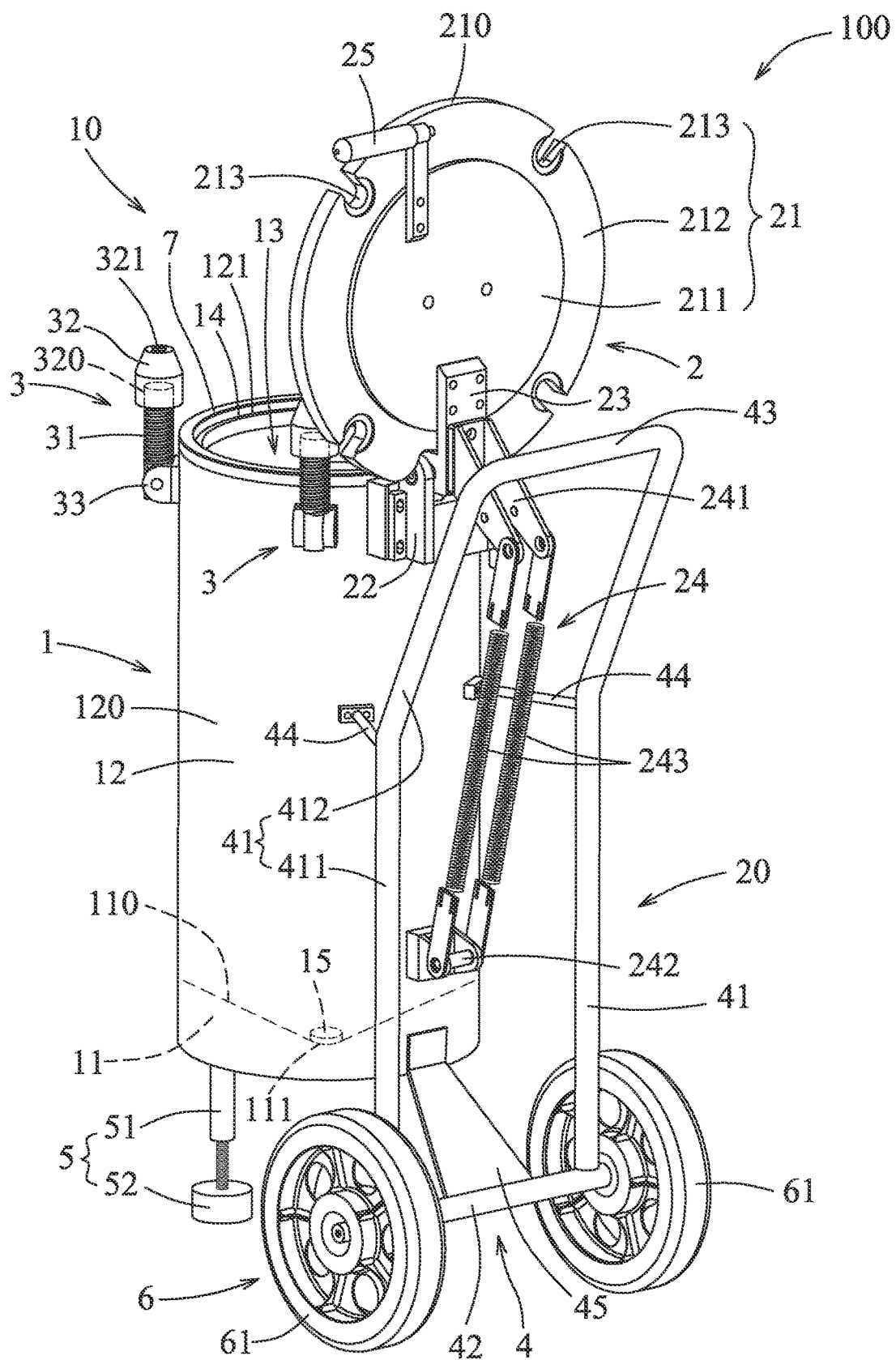
FIG. 2 is another schematic perspective view of the embodiment, illustrating a cover of the embodiment being open.
Figure 3:
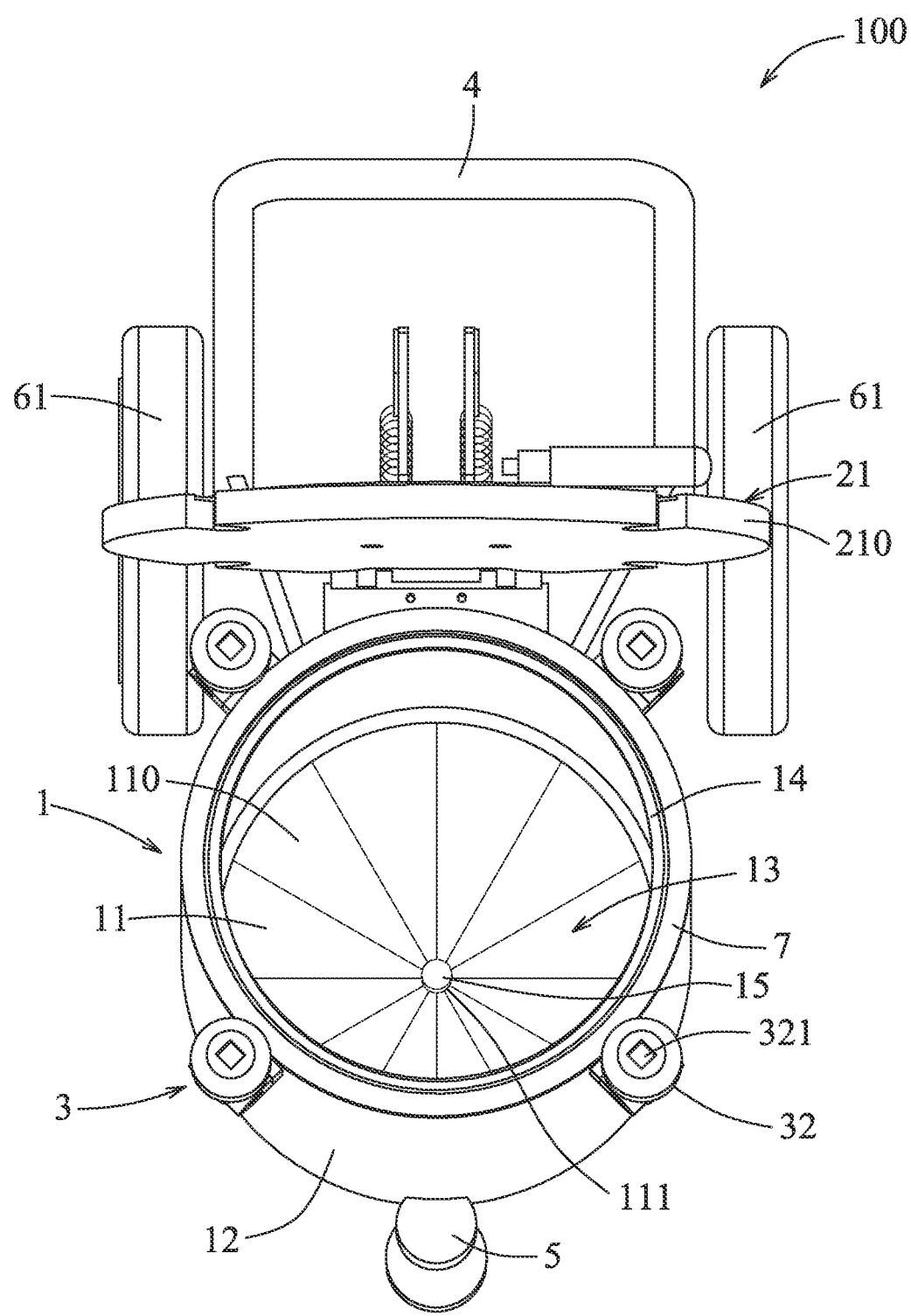
FIG. 3 is a top view of the embodiment.
Figure 4:
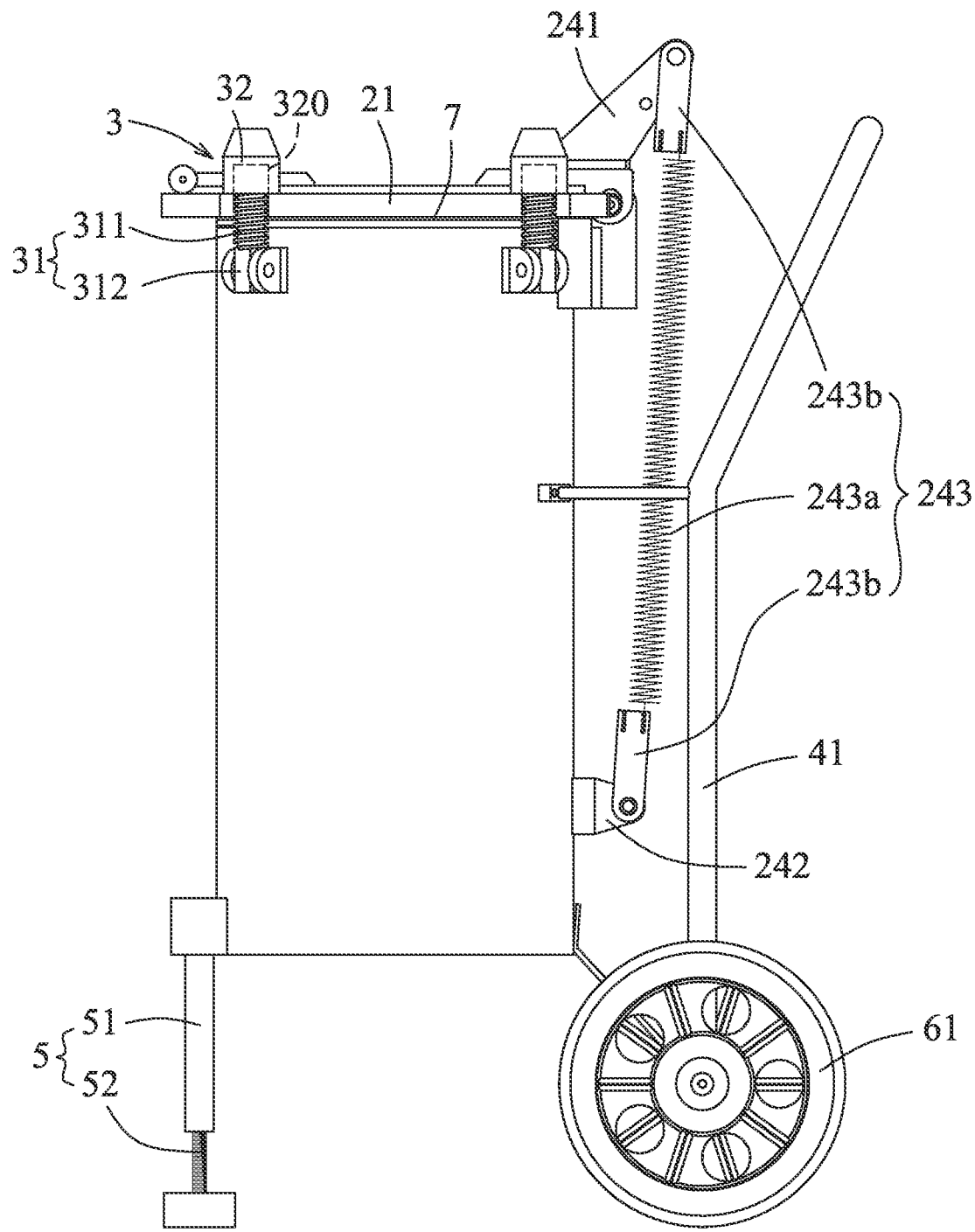
FIG. 4 is a schematic side view of the embodiment, illustrating the cover covering an opening.

The cover module 2 is connected to an outer surface 120 of the surrounding wall 12, and includes a cover 21 that is pivotably connected to the surrounding wall 12 and that removably covers the opening 14. As shown in FIG. 2, the cover 21 includes a central portion 211 and an outer annular portion 212. The central portion 211 is disposed on the upper rim 121 of the surrounding wall 12 for covering the opening 14 when the cover 21 covers the opening 14. The outer annular portion 212 extends radially and outwardly from the central portion 211, and has an outer periphery 210 that is indented to form a plurality of notches 213. The notches 213 are angularly spaced apart from one another, and extend from the outer periphery 210 toward the central portion 211. Specifically, the notches 213 are equiangularly spaced apart from one another. In this embodiment, the cover module 2 further includes a connecting seat 22 disposed on the outer surface 120 of the surrounding wall 12, and a connecting member 23 disposed on the cover 21 and pivotably connected to the connecting seat 22, such that the cover 21 is pivotably connected to the surrounding wall 12.

Additionally, the cover module 2 further includes a biasing unit 24 for keeping the cover 21 open. The biasing unit 24 includes a first seat 241, a second seat 242 and a pair of biasing members 243. The first seat 241 is disposed on the connecting member 23. The second seat 242 is disposed on the outer surface 120 of the surrounding wall 12 adjacent to the bottom wall 11. Each of the biasing members 243 is connected between the first seat 241 and the second seat 242, and is configured to provide biasing force to the cover 21 for keeping the cover 21 open, making it easier to place the cylinder into the receiving space 13 and to remove the cylinder from the receiving space 13. Specifically, each of the biasing members 243 includes a spring 243a having two opposite ends, and two connecting pieces 243b connected respectively to the opposite ends of the spring 243a and pivotably and respectively connected to the first seat 241 and the second seat 242. When an external force is exerted on the cover 21 to cover the opening 14, the springs 243a of the biasing members 243 are extended to store a restoring force. When the external force is removed, the restoring force stored in the springs 243a of the biasing members 243 causes the cover 21 to pivot relative to the surrounding wall 12 and open. In this embodiment, the cover module 2 further includes a handle member that is mounted on the cover 21 and that is accessible for a user to open and close the cover 21.

The fastening modules 3 are connected to the outer surface 120 of the surrounding wall 12, are disposed adjacent to the opening 14, and correspond in position respectively to the notches 213. Each of the fastening modules 3 includes a stem 31, an abutment head 32 and a connecting member 33. Since the configuration of each of the fastening modules 3 is identical, only one of the fastening modules 3 will be described in the following description. The stem 31 is removably disposed in and extends through a corresponding one of the notches 213, and includes a threaded segment 311 and a connecting segment 312. The threaded segment 311 has an external thread, and a distal end that is beyond the cover 21 when the cover 21 covers the opening 14. The abutment head is connected movably to the distal end. The connecting segment 312 extends from the threaded segment 311 in a direction opposite to the distal end, is opposite to the abutment head 32, and has a connected end pivotably connected to the connecting member 33 that is disposed on the outer surface 120 of the surrounding wall 12. The abutment head 32 is operable to move relative to and abuts against the cover 21 to press the cover 21 to the upper rim 121 of the surrounding wall 12 when the cover 21 covers the opening 14. Specifically, the abutment head 32 is formed with a threaded hole 320 that threadedly engages the threaded segment 311, and an operating portion 321 that is adapted to engage a tool (not shown) for driving the abutment head 32 to rotate relative to the stem 31. In this embodiment, the operating portion 321 is opposite to the threaded hole 320.

To cover the opening 14, the stem 31 is first brought to pivot outwardly away from the opening 14 until the stem 31 is removed from the corresponding one of the notches 213, such that the abutment head 32 is moved away from a path, along which the cover 21 pivots relative to the surrounding wall 12. After the cover 21 is placed on the upper rim 121 of the surrounding wall 12, the stem 31 is pivoted to be disposed in the corresponding one of the notches 213 with the abutment head 32 beyond the cover 21, and then the abutment head 32 is operated by the tool to rotate and move along the stem 31 until the abutment head 32 abuts against the cover 21 to press the cover 21. In this embodiment, the operating portion 321 of the abutment head 32 is configured as a socket fittingly engaging the tool, and the tool is a torque wrench that can be set with a target torque value of pound-foot, for example. In this way, the abutment heads 32 of the fastening modules 3 may exert the same pressure on the cover 21, and thus the cover 21 is evenly pressed to the upper rim 121 of the surrounding wall 12 by the abutment heads 32.

In this embodiment, the barrel body 1 and the cover 21 are made of metal and each has an inner surface coated with an anti-corrosion layer made of polymer material. Thus, the barrel body 1 and the cover 21 can be prevented from being damaged by the liquid chemical substance leaking out of the cylinder.

The carrier module 20 is connected to the barrel body 1 and is configured to carry the sealing barrel 10. In this embodiment, the carrier module 20 includes a main frame 4, a supporting member 5 and a wheel unit 6. The main frame 4 and the supporting member 5 are opposite to each other in a diametric direction of the barrel body 1, and are connected to the outer surface 120 of the surrounding wall 12. The wheel unit 6 is connected to the main frame 4 and cooperates with the supporting member 5 to support the barrel body 1 on a plane with the opening 14 facing upwardly.

The main frame 4 includes a pair of side rods 41, an axle shaft 42, a handle rod 43, two connecting rods 44 and a connecting plate 45. The side rods 41 generally extend in an up-down direction of the ERCV 100, and are spaced apart from each other in a left-right direction of the ERCV 100 transverse to the up-down direction. Each of the side rods 41 has a lower extremity end and an upper extremity end opposite to each other, and includes an upright segment 411 and an inclined segment 412. The upright segment 411 extends in the up-down direction, and has the lower extremity end and an upper end opposite to the lower extremity end. The inclined segment 412 extends upwardly from the upper end of the upright segment 411 and inclinedly away from the barrel body 1, and has the upper extremity end. The axle shaft 42 interconnects the lower extremity ends of the side rods 41, and has two ends opposite to each other in the left-right direction. The handle rod 43 interconnects the upper extremity ends of the side rods 41. Each of the connecting rods 44 interconnects a respective one of the side rods 41 and the outer surface 120 of the surrounding wall 12. The connecting plate 45 interconnects the axle shaft 42 and the outer surface 120 of the surrounding wall 12. The wheel unit 6 is for moving the sealing barrel 10, and includes two wheels 61 rotatably connected to the two ends of the axle shaft 42, respectively.

The supporting member 5 includes a fixed rod 51 and a supporting rod 52. The fixed rod 51 is connected to the outer surface 120 of the surrounding wall 12 and is disposed adjacent to the bottom wall 11. The supporting rod 52 threadedly engages the fixed rod 51, is partially inserted into the fixed rod 51, and is operable to rotate relative to the fixed rod 51. A total length of the supporting member 5 (i.e., a sum of a length of the fixed rod 51 and a length of a part of the supporting rod 52 that is exposed out of the fixed rod 51) is adjustable by rotating the supporting rod 52 to move relative to the fixed rod 51 in the up-down direction. In this way, when the ERCV 100 is disposed on an uneven plane, the supporting rod 52 can be rotated to adjust the total length of the supporting member 5 to cooperate with the wheels 61 so as to keep the barrel body 1 upright with the opening 14 facing upwardly.

In this embodiment, the ERCV 100 further includes an O-ring 7 disposed on the upper rim 121 of the barrel body 1 and adjacent to the opening 14. Thus, an air-tight seal is formed between the cover 21 and the upper rim 121 and air-tightness of the barrel body 1 is enhanced when the cover 21 covers the opening 14. In this way, the cylinder can be transported by the ERCV 100 in a relatively safe manner.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An emergency response containment vessel (ERCV) comprising:
   a sealing barrel including
      a barrel body including
         a bottom wall, and
         a surrounding wall being connected to and surrounding a periphery of said bottom wall, cooperating with said bottom wall to define a receiving space that is adapted for receiving a cylinder therein and that has an opening opposite to said bottom wall, and including an upper rim that defines said opening,
      a cover module being connected to an outer surface of said surrounding wall and including a cover that is pivotably connected to said surrounding wall and that removably covers said opening, said cover including a central portion disposed on said upper rim of said surrounding wall for covering said opening when said cover covers said opening, and an outer annular portion extending radially and outwardly from said central portion and having an outer periphery that is indented to form a plurality of notches, said notches being angularly spaced apart from one another and extending from said outer periphery toward said central portion, and
      a plurality of fastening modules connected to said outer surface of said surrounding wall, disposed adjacent to said opening, and corresponding in position respectively to said notches, each of said fastening modules including
         a stem that has a connected end connected to said outer surface and a distal end opposite to said connected end, and that is removably disposed in and extends through a corresponding one of said notches with said distal end beyond said cover when said cover covers said opening, and
         an abutment head that is movably connected to said distal end of said stem, and that is operable to move relative to and abut against said cover to press said cover to said upper rim of said surrounding wall when said cover covers said opening; and
   a carrier module connected to said barrel body, configured to carry said sealing barrel, and including a wheel unit for moving said sealing barrel.

2. The ERCV as claimed in claim 1, wherein each of said fastening modules further includes a connecting member disposed on said outer surface, and said stem of each of said fastening modules includes a connecting segment that is opposite to said abutment head and that has said connected end pivotably connected to said connecting member.

3. The ERCV as claimed in claim 2, wherein, for each of said fastening modules, said stem further includes a threaded segment that has an external thread and said distal end, and said abutment head is formed with a threaded hole that threadedly engages said threaded segment.

4. The ERCV as claimed in claim 3, wherein said abutment head is further formed with an operating portion that is adapted to engage a tool for driving said abutment head to rotate relative to said stem.

5. The ERCV as claimed in claim 1, wherein said cover module further includes a connecting seat disposed on said outer surface of said surrounding wall, and a connecting member disposed on said cover and pivotably connected to said connecting seat.

6. The ERCV as claimed in claim 5, wherein said cover module further includes a biasing unit including a first seat disposed on said connecting member, a second seat disposed on said outer surface of said surrounding wall adjacent to said bottom wall, and a pair of biasing members each pivotably connected between said first seat and said second seat, said biasing members being configured to provide a biasing force to said cover for keeping said cover open.

7. The ERCV as claimed in claim 6, wherein each of said biasing members includes a spring having two opposite ends, and two connecting pieces connected respectively to said opposite ends of said spring and pivotably and respectively connected to said first seat and said second seat.

8. The ERCV as claimed in claim 1, wherein said carrier module further includes a main frame and a supporting member that are opposite to each other in a diametric direction of said barrel body and that are connected to said outer surface of said surrounding wall, said wheel unit being connected to said main frame and cooperating with said supporting member to support said barrel body on a plane with said opening facing upwardly.

9. The ERCV as claimed in claim 8, wherein said main frame includes:
   a pair of side rods extending in an up-down direction and spaced apart from each other in a left-right direction transverse to the up-down direction, each of said side rods having a lower extremity end and an upper extremity end;

an axle shaft interconnecting said lower extremity ends of said side rods, and having two ends opposite to each other in the left-right direction;

a handle rod interconnecting said upper extremity ends of said side rods;

two connecting rods each interconnecting a respective one of said side rods and said outer surface of said surrounding wall; and a connecting plate interconnecting said axle shaft and said outer surface of said surrounding wall, wherein said wheel unit includes two wheels rotatably connected to said two ends of said axle shaft, respectively.

10. The ERCV as claimed in claim 8, wherein said supporting member includes a fixed rod connected to said outer surface of said surrounding wall and disposed adjacent to said bottom wall, and a supporting rod threadedly engaging said fixed rod and operable to rotate relative to said fixed rod, wherein a length of said supporting member is adjustable by rotating said supporting rod to move relative to said fixed rod in an up-down direction.

11. The ERCV as claimed in claim 1, wherein said barrel body and said cover are made of metal and each has an inner surface coated with an anti-corrosion layer made of polymer material.

12. The ERCV as claimed in claim 1, wherein said bottom wall has an upper surface that faces upwardly and that has a central plane portion formed with an outlet, and an outer inclined portion surrounding said central plane portion and inclined downwardly from said periphery of said bottom wall to said central plane portion, wherein said barrel body further includes a valve disposed on said bottom wall to cover said outlet and configured to open and close said outlet.

\* \* \* \* \*